US012538993B1

(12) United States Patent
Prickett

(10) Patent No.: US 12,538,993 B1
(45) Date of Patent: Feb. 3, 2026

(54) INTERCHANGEABLE UTENSIL ASSEMBLY

(71) Applicant: Mark A. Prickett, Madison, IN (US)

(72) Inventor: Mark A. Prickett, Madison, IN (US)

( * ) Notice: Subject to any disclaimer, the term of this patent is extended or adjusted under 35 U.S.C. 154(b) by 145 days.

(21) Appl. No.: 17/580,081

(22) Filed: Jan. 20, 2022

Related U.S. Application Data

(60) Provisional application No. 63/142,285, filed on Jan. 27, 2021.

(51) Int. Cl.
*A47G 21/10* (2006.01)
*A47J 43/28* (2006.01)
*B25G 3/28* (2006.01)

(52) U.S. Cl.
CPC ............ *A47G 21/10* (2013.01); *A47J 43/283* (2013.01); *A47J 43/288* (2013.01); *B25G 3/28* (2013.01)

(58) Field of Classification Search
CPC ... A47G 21/10; A47J 43/28–288; B26B 13/04
See application file for complete search history.

(56) References Cited

U.S. PATENT DOCUMENTS

| | | | | |
|---|---|---|---|---|
| 3,510,643 A * | 5/1970 | File | ........................... | F21L 2/00 30/150 |
| 4,275,646 A * | 6/1981 | Barna | ..................... | A47G 19/16 294/99.2 |
| 4,823,419 A * | 4/1989 | Stimpson | .................. | B25F 1/00 7/113 |
| 4,826,227 A * | 5/1989 | Lew | ...................... | A47G 21/103 294/99.2 |
| 5,086,563 A * | 2/1992 | Sakuma | ................... | B26B 13/04 30/341 |
| 5,901,993 A * | 5/1999 | Lowery | ..................... | B25B 7/02 294/7 |
| 5,947,286 A * | 9/1999 | Chau | ...................... | A45C 13/02 206/372 |
| 6,536,819 B2 * | 3/2003 | Wang | ..................... | A47G 21/10 294/99.2 |
| 6,981,593 B1 * | 1/2006 | Klodt | ..................... | A45C 13/02 206/541 |
| 7,290,661 B1 * | 11/2007 | DeFino | .................. | A47G 21/14 220/252 |
| D570,049 S * | 5/2008 | Harrison, III | .................. | D28/55 |
| 8,684,183 B2 * | 4/2014 | Trannon | ................. | A45C 13/02 206/541 |

(Continued)

*Primary Examiner* — Adam J Eiseman
*Assistant Examiner* — Richard D Crosby, Jr.
(74) *Attorney, Agent, or Firm* — FROST BROWN TODD LLP

(57) ABSTRACT

A utensil assembly is provided for performing various food preparation tasks. The utensil assembly includes a handle and one or more utensils selectively interchangeable with the handle. The handle includes a first support and a second support pivotable relative to the first support between a closed position and an open position. Each of the one or more utensils include a utensil portion and a coupling portion extending from the utensil portion. The coupling portion is selectively couplable with one or both of the first support and the second support. The utensil assembly can also include a resilient member coupled with the first support and the second support. A tray can be provided to store the handle and the one or more utensils.

15 Claims, 4 Drawing Sheets

(56) References Cited

U.S. PATENT DOCUMENTS

| | | | | |
|---|---|---|---|---|
| 8,746,765 B1* | 6/2014 | Mafi | A47J 43/288 | 294/7 |
| 8,782,907 B2* | 7/2014 | Chong | A47G 21/06 | 30/142 |
| 8,870,254 B2* | 10/2014 | Marshall, III | A47G 21/10 | 294/99.2 |
| 9,474,418 B1* | 10/2016 | Liu | A47J 43/283 | |
| 10,518,402 B1* | 12/2019 | Polen | B25F 1/02 | |
| 2003/0029770 A1* | 2/2003 | MacKinnon | A45C 11/00 | 206/541 |
| 2003/0097759 A1* | 5/2003 | Bond | A47J 43/288 | 30/340 |
| 2006/0200993 A1* | 9/2006 | Di Paolo | A47J 37/0786 | 30/129 |
| 2009/0121062 A1* | 5/2009 | Silver | A47J 43/25 | 241/168 |
| 2009/0140535 A1* | 6/2009 | Spellman | A47G 21/10 | 7/113 |
| 2010/0107421 A1* | 5/2010 | Cedar | B26B 13/06 | 30/232 |
| 2010/0263219 A1* | 10/2010 | Kempker | B26B 25/005 | 83/13 |
| 2010/0295326 A1* | 11/2010 | Chen | B25B 9/02 | 294/99.2 |
| 2010/0323077 A1* | 12/2010 | Moon | A47J 43/283 | 426/523 |
| 2011/0239376 A1* | 10/2011 | Schmidt | A45F 4/00 | 126/152 B |
| 2012/0043774 A1* | 2/2012 | Floyd | A47J 43/283 | 294/3 |
| 2012/0139276 A1* | 6/2012 | Green | A47J 43/283 | 294/86.4 |
| 2014/0084615 A1* | 3/2014 | Schoeman | A47G 21/10 | 294/198 |
| 2014/0138280 A1* | 5/2014 | Meinzer | B25G 1/04 | 403/287 |
| 2018/0140134 A1* | 5/2018 | Braddy, Jr. | A47J 37/0786 | |
| 2019/0099023 A1* | 4/2019 | Kwan-Gett | A47J 43/283 | |
| 2019/0208939 A1* | 7/2019 | Heuberger | A47G 21/00 | |
| 2020/0196801 A1* | 6/2020 | McCormack | G01K 1/14 | |
| 2021/0267419 A1* | 9/2021 | Bradford | A47J 43/288 | |
| 2021/0401232 A1* | 12/2021 | Li | A47J 43/288 | |

* cited by examiner

INTERCHANGEABLE UTENSIL ASSEMBLY

This application claims the benefit of and priority to U.S. Provisional Patent Application Ser. No. 63/142,285, filed Jan. 27, 2021, entitled "Interchangeable Utensil Assembly" the disclosure of which is incorporated by reference herein.

FIELD

The present disclosure related to a utensil assembly, and in particular a utensil assembly having interchangeable utensils.

BACKGROUND

A typical utensil includes a hand-held tool that is used for food preparation tasks. Common food preparation tasks include cutting food items, heating food items, baking, grinding, mixing, blending, measuring, etc. A typical utensil generally includes a single utensil with an integral handle such that a different utensil is needed for each food preparation task. Because different utensils are needed to perform various food preparation tasks, it can be inefficient to switch and/or clean the utensils needed for each task and it can be difficult to store the utensils needed for each task.

SUMMARY

In one embodiment, a utensil assembly may comprise a handle and one or more utensils. The handle includes a first support and a second support pivotable relative to the first support between a closed position and an open position. Each of the one or more utensils include a utensil portion and a coupling portion extending from the utensil portion. The coupling portion is selectively couplable with one or both of the first support and the second support such that each of the one or more utensils are interchangeable with the handle.

In another embodiment, a utensil assembly may comprise a handle including a first support and a second support. Each of the first support and the second support include a first end and a second end. A resilient member is coupled with the first end of the first support and the first end of the second support such that the second support is pivotable relative to the first support between a closed position and an open position about the resilient member. A first utensil includes a first utensil portion and a first coupling portion extending from the first utensil portion such that the first coupling portion is selectively couplable with the second end of a select one of the first support and the second support. A second utensil includes a second utensil portion and a second coupling portion extending from the second utensil portion such that the second coupling portion is selectively couplable with the second end a select one of the first support and the second support such that the first utensil and the second utensil are interchangeable.

In another embodiment, a utensil assembly may comprise a handle and one or more utensils. The handle includes a first support and a second support pivotable relative to the first support between a closed position and an open position. Each of the one or more utensils include a utensil portion and a coupling portion extending from the utensil portion. The coupling portion is selectively couplable with one or both of the first support and the second support such that each of the one or more utensils are interchangeable with the handle. A tray includes a storage area having a plurality of recesses, wherein each recess of the plurality of recesses are configured to receive a select one of the handle and the one or more utensils.

BRIEF DESCRIPTION OF THE DRAWINGS

The accompanying drawings illustrate embodiments which serve to explain the principles of the present innovation.

Figure 1:
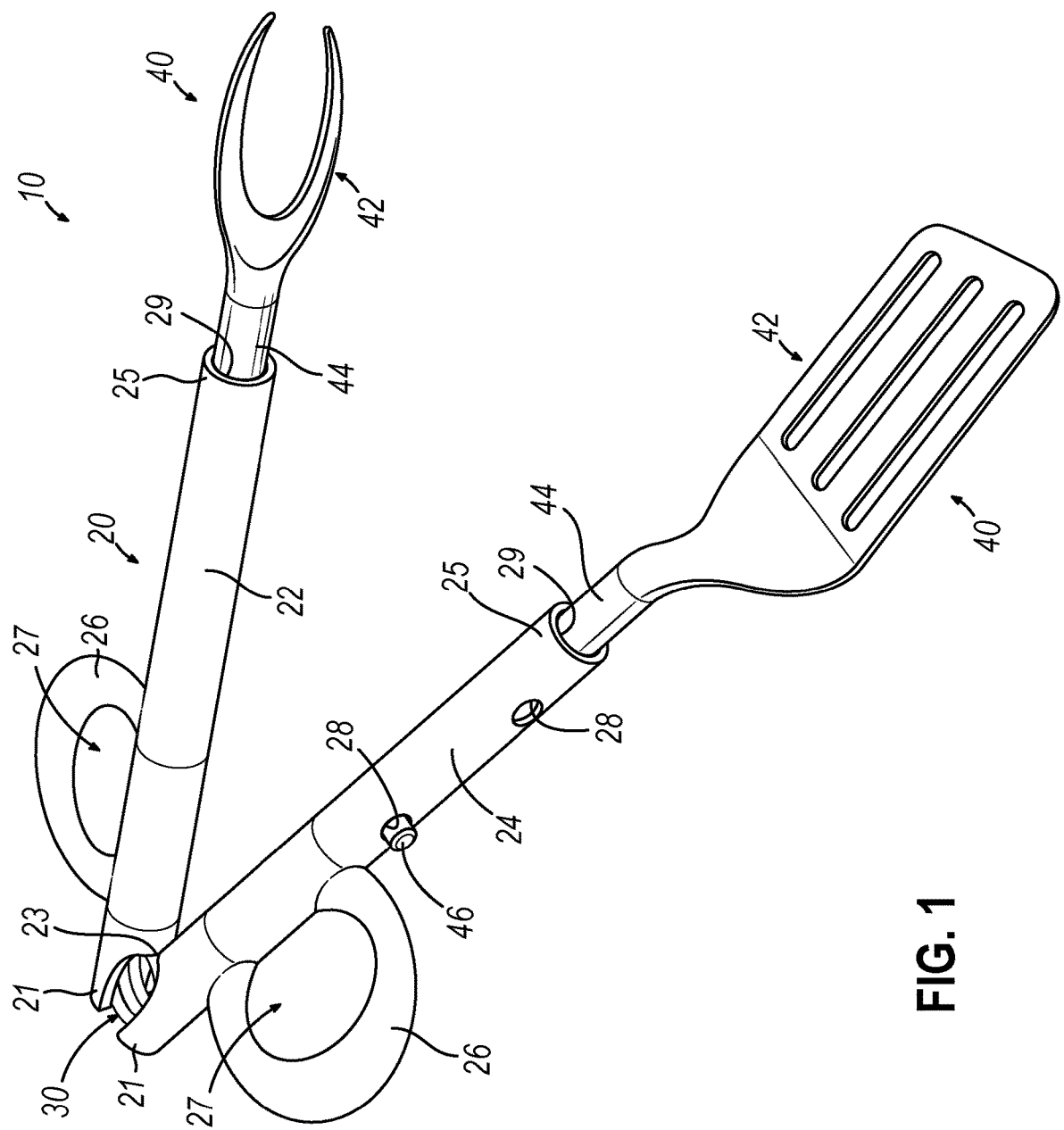
FIG. 1 depicts a perspective view of an exemplary interchangeable utensil assembly.

The drawings are not intended to be limiting in any way, and it is contemplated that various embodiments of the innovation may be carried out in a variety of other ways, including those not necessarily depicted in the drawings. The accompanying drawings incorporated in and forming a part of the specification illustrate several aspects of the present innovation, and together with the description serve to explain the principles of the innovation; it being understood, however, that this innovation is not limited to the precise arrangements shown.

DETAILED DESCRIPTION

The following description of certain examples of the innovation should not be used to limit the scope of the present innovation. Other examples, features, aspects, embodiments, and advantages of the innovation will become apparent to those skilled in the art from the following description, which is by way of illustration, one of the best modes contemplated for carrying out the innovation. As will be realized, the innovation is capable of other different and obvious aspects, all without departing from the innovation. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

The word "exemplary" is used herein to mean "serving as an example, instance, or illustration." Any implementation described herein as "exemplary" is not necessarily to be construed as preferred or advantageous over other implementations.

Figure 2:
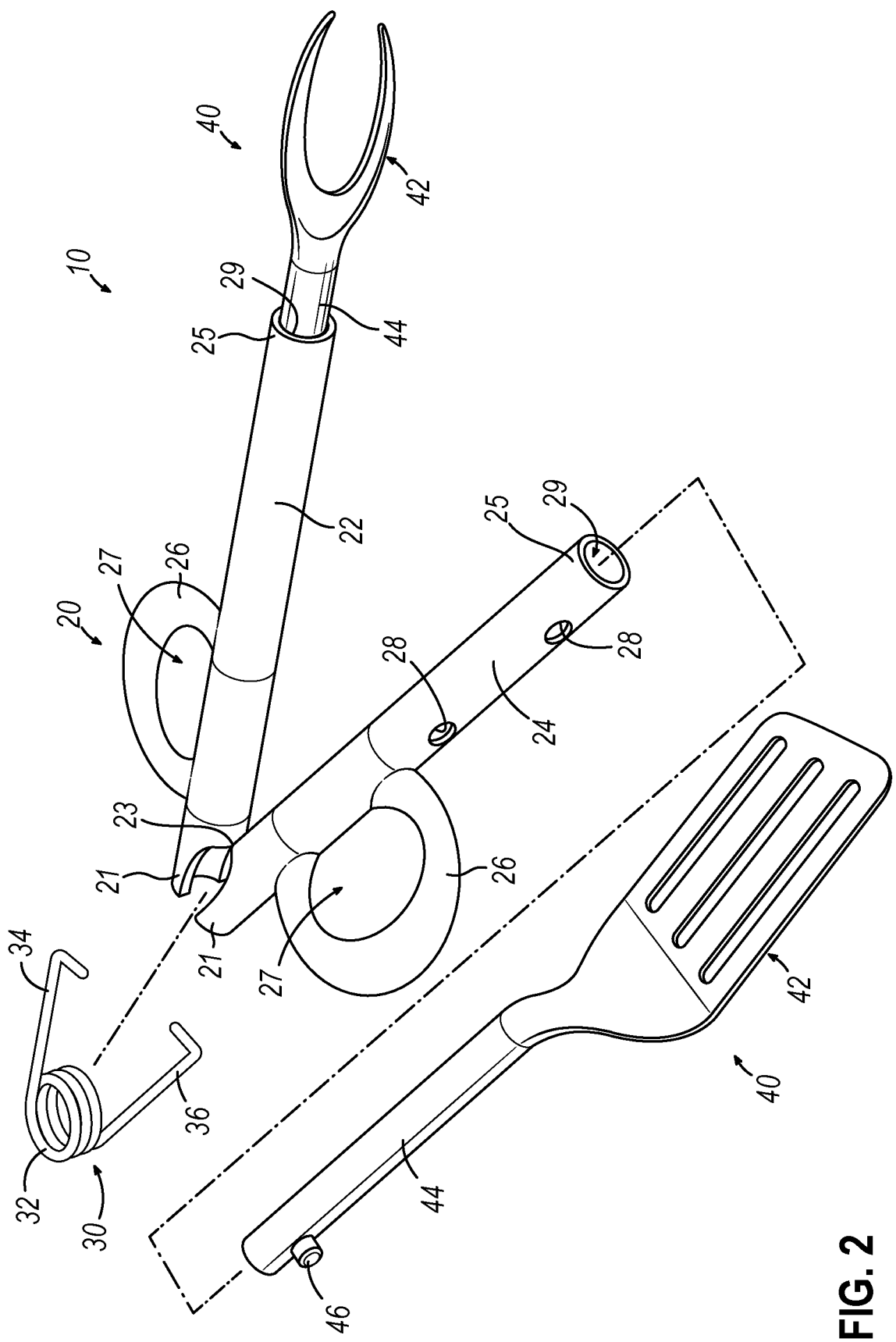
FIG. 2 depicts an exploded view of the interchangeable utensil assembly of FIG. 1.

FIGS. 1-2 show an exemplary interchangeable utensil assembly (10) comprising a handle (20), a resilient member (30), and one or more utensils (40) selectively couplable with handle (20). Utensil assembly (10) can be made from stainless steel, plastic, rubber, and/or any other suitable material that is dishwasher safe. Handle (20) comprises a first support (22) and a second support (24) that is pivotable relative to first support (22) between an open position and a closed position. Each of first and second supports (22, 24) include a hook (26) extending outwardly on opposing sides of first and second supports (22, 24) that define an opening (27) therethrough. Hooks (26) are configured to allow handle (20) to be hung from one or both hooks (26). In some versions, hooks (26) are configured to allow a user to grasp one or both of hooks (26) during operation of utensil assembly (10) such that a user can insert one or more fingers through opening (27) of hooks (26).

Handle (20) further includes one or more openings (28) extending through each of first and second supports (22, 24) such that openings (28) are positioned longitudinally along first and second supports (22, 24). Each of first and second supports (22, 24) further include a first end (21), a second end (25), and an opening (29) extending longitudinally therethrough from first end (21) to second end (25). First end (21) is configured to receive resilient member (30) and second end (25) is configured to receive one or more utensils (40) as will be described in more detail below. In the illustrated version, first end (21) of each of first and second supports (22, 24) are coupled together at a connection point (23) such that second support (24) is pivotable relative to first support (22) about connection point (23). Accordingly, handle (20) includes a tong-type configuration. In some other versions, first and second supports (22, 24) are not coupled together such that first and second supports (22, 24) are pivotable about resilient member (30). Still other suitable configurations for handle (20) will be apparent to one with ordinary skill in the art in view of the teachings herein.

Resilient member (30) of the illustrated version comprises a torsion spring having a coiled spring portion (32) and a pair of arms (34, 36) extending outwardly from coiled spring portion (32). Accordingly, a first arm (34) of resilient member (30) is inserted within opening (29) at first end (21) of first support (22) and a second arm (36) of resilient member (30) is inserted within opening (29) at first end (21) of second support (24). Resilient member (30) is biased in a compressed configuration such that resilient member (30) is configured to maintain first and second supports (22, 24) in a closed position. Resilient member (30) can flex outwardly when first and second supports (22, 24) are pulled apart to an open position and then bias back inwardly to return first and second supports (22, 24) to the closed position (see FIG. 3). Still other suitable configurations for resilient member (30) will be apparent to one with ordinary skill in the art in view of the teachings herein. For instance, in some versions, resilient member is in tension to maintain first and second supports (22, 24) in the open position. In some other versions, resilient member (30) can include a resilient material (e.g., rubber, polymers, stainless steel, etc.) instead of a spring.

Utensils (40) include a utensil portion (42) and a coupling portion (44) extending from utensil portion (42). Utensil portion (42) can be configured as any suitable type of utensil (e.g., spoon, fork, spatula, knife, meat thermometer, pasta server, etc.). Coupling portion (44) is sized to correspond to opening (29) of first and second supports (22, 24) at second ends (25) such that coupling portion (44) is insertable within opening (29) of one or both of first and second supports (22, 24). Coupling portion (44) comprises a resilient button (46) extending outwardly from coupling portion (44). Resilient button (46) is configured to be inserted through longitudinal openings (28) of first and second supports (22, 24). Accordingly, resilient button (46) can compress inwardly as coupling portion (42) is inserted through second end (25) of first or second support (22, 24) until resilient button (46) is aligned with a desired opening (28) such that resilient button (46) biases outwardly to insert through the desired opening (28). Accordingly, the length of utensil (40) extending from first and/or second support (22, 24) is adjustable by inserting resilient button (46) into various openings (28) positioned longitudinally along first and second supports (22, 24). Resilient button (46) is thereby configured to maintain the position of utensil (40) relative to handle (20). Still other suitable configurations for coupling a utensil (40) with handle (20) will be apparent to one with ordinary skill in the art in view of the teachings herein. For instance, utensil (40) may be coupled with handle (20) by a friction fit, a keyed fit, a threaded coupling, etc.

Accordingly, in use, coupling portion (44) of a first utensil (40) can be inserted within second end (25) of first support (22) of handle (20) until button (46) of coupling portion (44) is inserted within the desired opening (28). Coupling portion (44) of a second utensil (40) can be inserted within second end (25) of second support (24) of handle (20) until button (46) of coupling portion (44) is inserted within the desired opening (28). The first and second utensils (40) can include the same type of utensil portion (42) or different types of utensil portions (42). The first and second utensils (40) can be inserted into first and second supports (22, 24) such that the first and second utensils (40) extend at substantially the same length from first and second supports (22, 24) or the first and second utensils (40) can be inserted into first and second supports (22, 24) such that the first and second utensils (40) extend at different lengths from first and second supports (22, 24). In some versions, only one utensil (40) is coupled with first or second support (22, 24).

Figure 3:
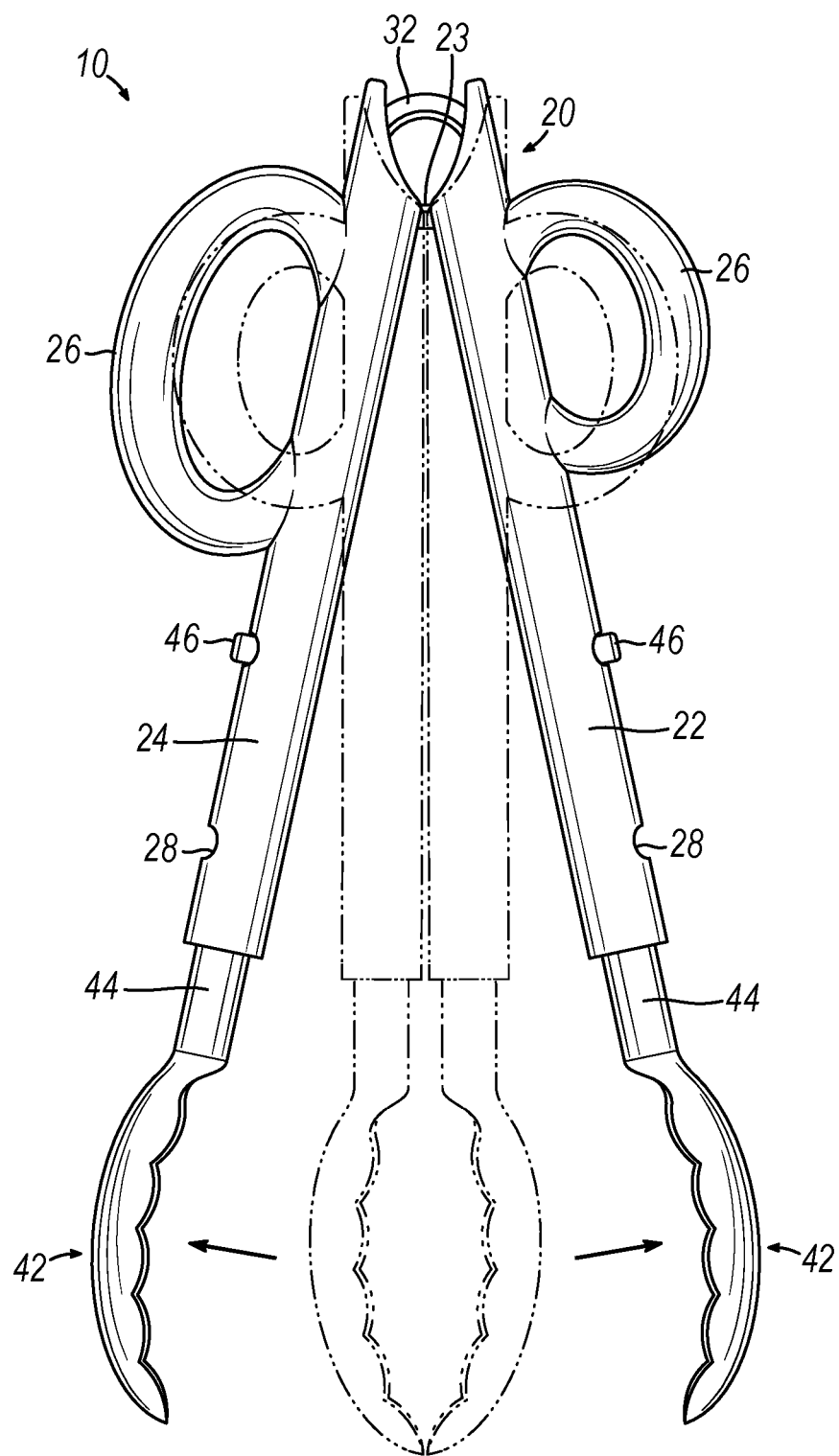
FIG. 3 depicts a front view of the interchangeable utensil device of FIG. 1 being moved from an open position to a closed position.

With the desired utensils (40) coupled with handle (20), a user can perform various food preparation tasks. For instance, the user can pull first and second supports (22, 24) apart from the closed position to the open position, as shown in FIG. 3, to position food between the first and second utensils (40). The user can then release the force on handle (20) to allow first and second supports (22, 24) to return to the closed position by resilient member (30) to grasp the food with the first and second utensils (40). Additionally or alternatively, the user can use one or both of utensils (40) individually to perform a food preparation task. Once, the food preparation task is complete, the user can press button (46) of the utensils (40) to decouple the utensils (40) from handle (20). A different utensil (40) can then be inserted into handle (20) such that one or more utensils (40) are interchangeable with handle (20). Utensil assembly (10) can also be cleaned and stored in the decoupled configuration.

Interchangeable utensil assembly (10) thereby provides flexibility and/or efficiency in performing various food preparation tasks by providing various utensils (40) that are interchangeable with one handle (20). For instance, a user could turn meat over and check its temperature with utensil assembly (10) without the need to change utensils. The compressed configuration of resilient member (30) to bias first and second supports (22, 24) of handle (20) inwardly to the closed position can inhibit handle (20) from inadvertently pivoting to the open position to allow food to drop form utensil assembly (10). This can also allow utensil assembly (10) to be more organized in storage by using less space than a utensil that is biased to an open position.

Figure 4:
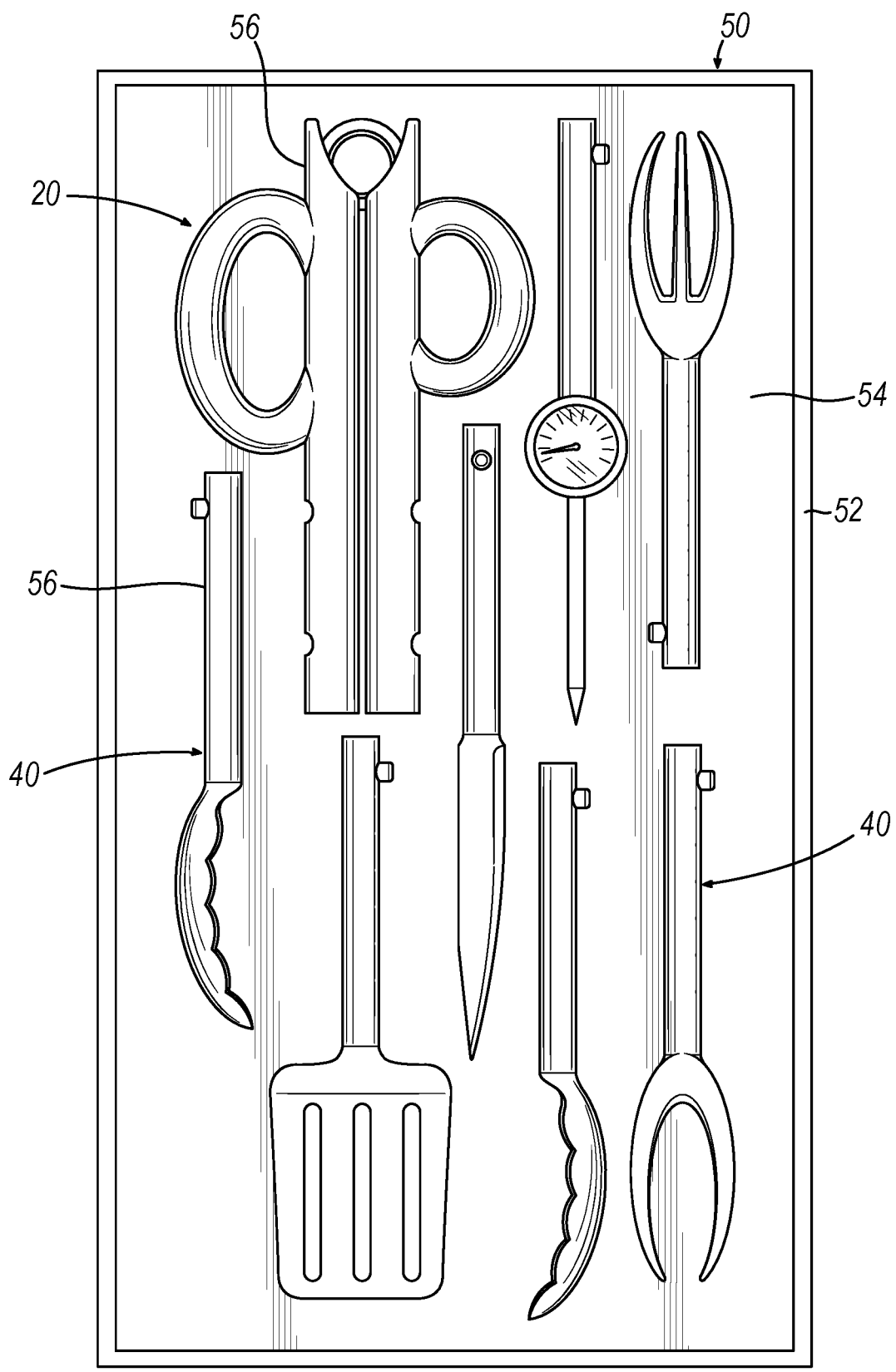
FIG. 4 depicts a top plan view of the interchangeable utensil assembly of FIG. 1 housed within a tray.

Referring to FIG. 4, an exemplary tray (50) is shown for storing utensil assembly (10). Tray (50) comprises a casing (52) extending about a storage area (54). Storage area (54) includes a plurality of recesses (56) for storing handle (20) and/or one or more utensils (40). While the illustrated version shows recesses (56) sized to correspond to each stored item, recesses (56) can include any suitable shape (e.g., rectangular, oval, square, etc.). Tray (50) can have a width from about 8 inches to about 24 inches and a length from about 12 inches to about 20 inches, though any other suitable dimensions can be used. Tray (50) can by made from plastic, metal, rubber, and/or any other suitable material that is dishwasher safe. Still other suitable configurations for tray (50) will be apparent to one with ordinary skill in the art in view of the teachings herein.

Having shown and described various embodiments of the present innovation, further adaptations of the methods and systems described herein may be accomplished by appropriate modifications by one of ordinary skill in the art without departing from the scope of the present innovation. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present innovation should be considered in terms of the following claims and is understood not to be limited to the details of structure and operation shown and described in the specification and drawings.

I claim:

1. A utensil assembly comprising:
    a handle including a first support and a second support, wherein each of the first support and the second support have a first end and a second end, wherein the second support is pivotable relative to the first support between a closed position and an open position, wherein each of the first support and the second support have an opening at their respective first ends, wherein the first end of the first support is a distal tip of the first support and the second end of the first support is a proximal tip of the first support, and wherein the first end of the second support is a distal tip of the second support and the second end of the second support is a proximal tip of the second support;
    a resilient member which is partially exposed, and which comprises a spring portion, a first arm and a second arm, wherein the first arm and the second arm extend outwardly from the spring portion, wherein the first arm is insertable into the first support via the opening at the first end of the first support, wherein the second arm is insertable into the second support via the opening at the first end of the second support, and wherein, with the first arm inserted in to the first support and the second arm inserted into the second support, the spring portion biases the first support and the second support of the handle to the closed position via exerting an inward pressure; and
    one or more utensils, wherein each of the one or more utensils include a utensil portion and a coupling portion extending from the utensil portion, wherein the coupling portion is selectively couplable with the second end of one or both of the first support and the second support such that each of the one or more utensils are interchangeable with the handle.

2. The utensil assembly of claim 1, wherein the first support and the second support of the handle are connected solely via the first arm and second arms of the resilient member being inserted into the openings at the first end of the first and second supports.

3. The utensil assembly of claim 1, wherein the first support and the second support are coupled together at a connection point located at their respective first ends.

4. The utensil assembly of claim 1, wherein the first support and the second support are each hollow.

5. The utensil assembly of claim 1, wherein:
    the second support is pivotable relative to the first support about a pivot point; and
    the handle comprises:
        a first hook on an outside surface of the first support between the pivot point and the second end of the first support; and
        a second hook on an outside surface of the second support between the pivot point and the second end of the second support.

6. A utensil assembly comprising:
    a handle including a first support and a second support, wherein each of the first support and the second support have a first end and a second end, wherein the second support is pivotable relative to the first support between a closed position and an open position, wherein each of the first support and the second support have an opening at their respective first ends, wherein the first end of the first support is a distal tip of the first support and the second end of the first support is a proximal tip of the first support, and wherein the first end of the second support is a distal tip of the second support and the second end of the second support is a proximal tip of the second support;
    a resilient member which is partially exposed, and which comprises a spring portion, a first arm and a second arm, wherein the first arm and the second arm extend outwardly from the spring portion, wherein the first arm is insertable into the first support via the opening at the first end of the first support, wherein the second arm is insertable into the second support via the opening at the first end of the second support, and wherein, with the first arm inserted in to the first support and the second arm inserted into the second support, the spring portion biases the first support and the second support of the handle to the closed position via exerting an inward pressure;
    one or more utensils, wherein each of the one or more utensils include a utensil portion and a coupling portion extending from the utensil portion, wherein the coupling portion is selectively couplable with the second end of one or both of the first support and the second support such that each of the one or more utensils are interchangeable with the handle; and
    a tray including a storage area having a plurality of recesses, wherein each recess of the plurality of recesses are configured to receive a select one of the handle and the one or more utensils.

7. The utensil assembly of claim 6, wherein the first support and the second support of the handle are connected solely via the first arm and second arms of the resilient member being inserted into the openings at the first end of the first and second supports.

8. The utensil assembly of claim 6, wherein the first support and the second support are coupled together at a connection point located at their respective first ends.

9. The utensil assembly of claim 6, wherein the first support and the second support are each hollow.

10. The utensil assembly of claim 6, wherein:
    the second support is pivotable relative to the first support about a pivot point; and
    the handle comprises:
        a first hook on an outside surface of the first support between the pivot point and the second end of the first support; and a second hook on an outside surface of the second support between the pivot point and the second end of the second support.

11. A utensil assembly comprising:

a first support having a first end and a second end wherein the first end is a distal tip of the first support and the second end is a proximal tip of the first support;

a second support having a first end and a second end wherein the first end is a distal tip of the second support and the second end is a proximal tip of the second support;

a resilient member which is partially exposed, and which comprises:
  a first arm operable to be inserted into an opening at the first end of the first support and coupled to the first end of the first support;
  a second arm operable to be inserted into an opening at the first end of the second support and coupled to the first end of the second support; and
  a spring portion which biases the second end of the first support and the second end of the second support toward each other by exerting an inward pressure on the first end of the first support and the first end of the second support;
and
one or more utensils, wherein each of the one or more utensils comprises a utensil portion and a coupling portion extending from the utensil portion, wherein the utensil portion is selectively couplable with one or both of the second ends of first support and the second support.

12. The utensil assembly of claim 11, wherein the first support and the second support of the handle are connected solely via the first arm and second arms of the resilient member being inserted into the openings at the first end of the first and second supports.

13. The utensil assembly of claim 11, wherein the first support and the second support are coupled together at a connection point located at their respective first ends.

14. The utensil assembly of claim 11, wherein the first support and the second support are each hollow.

15. The utensil assembly of claim 11, wherein:
the second support is pivotable relative to the first support about a pivot point at the distal tip of the first and second supports; and
the handle comprises:
  a first hook on an outside surface of the first support between the pivot point and the second end of the first support; and
  a second hook on an outside surface of the second support between the pivot point and the second end of the second support.

* * * * *